US012673587B2

(12) United States Patent
Jung et al.

(10) Patent No.: US 12,673,587 B2
(45) Date of Patent: Jul. 7, 2026

(54) SEAT FOR VEHICLE

(71) Applicants:HYUNDAI MOTOR COMPANY, Seoul (KR); KIA CORPORATION, Seoul (KR); DAS CO., LTD, Gyeongju-si (KR)

(72) Inventors: Chan Ho Jung, Gunpo-si (KR); Ho Suk Jung, Hwaseong-si (KR); Sang Soo Lee, Hwaseong-si (KR); Hyun Kyu Moon, Incheon (KR); Dong Hoon Keum, Busan (KR); Byung Yong Choi, Hwaseong-si (KR); Deok Soo Lim, Hwaseong-si (KR); Mu Young Kim, Osan-si (KR); Jin Ho Choi, Gyeongju-si (KR); Jae Youn Kim, Ulsan (KR)

(73) Assignees: HYUNDAI MOTOR COMPANY, Seoul (KR); KIA CORPORATION, Seoul (KR); DAS CO., LTD, Gyeongju-si (KR)

( * ) Notice: Subject to any disclaimer, the term of this patent is extended or adjusted under 35 U.S.C. 154(b) by 169 days.

(21) Appl. No.: 18/659,403

(22) Filed: May 9, 2024

(65) Prior Publication Data

US 2025/0196730 A1     Jun. 19, 2025

(30) Foreign Application Priority Data

Dec. 19, 2023     (KR) ........................ 10-2023-0185560

(51) Int. Cl.
B60N 2/12 (2006.01)
B60N 2/02 (2006.01)
(Continued)

(52) U.S. Cl.
CPC .......... B60N 2/12 (2013.01); B60N 2/02253 (2023.08); B60N 2/1695 (2013.01); B60N 2/1803 (2013.01); B60N 2/20 (2013.01)

(58) Field of Classification Search
CPC .......... B60N 2/1695; B60N 2/12; B60N 2/20; B60N 2/1803
See application file for complete search history.

(56) References Cited

U.S. PATENT DOCUMENTS 5,979,985  A  *  11/1999  Bauer .................. B60N 2/1695
8,870,286  B2 *  10/2014  Jungert .................. B60N 2/18
(Continued)

FOREIGN PATENT DOCUMENTS

KR          10-2338310  B1     12/2021

*Primary Examiner* — Rodney B White
(74) *Attorney, Agent, or Firm* — MCDONNELL BOEHNEN HULBERT & BERGHOFF LLP

(57) ABSTRACT

A seat for a vehicle includes a pair of seat rails coupled to the vehicle and spaced apart from each other in left and right directions; a pair of left and right sliders installed on the pair of seat rails to slide in forward and rearward directions; a pair of left and right side frames configured to change a position thereof with respect to each of the pair of sliders; a link arm connecting the slider and the side frame on one side in forward and rearward directions; a linker connecting the slider and the side frame on the other side in forward and rearward directions, and including a plurality of link members; and a plurality of drivers respectively connected to the plurality of link members of the linker to provide rotational force.

17 Claims, 6 Drawing Sheets

(51) Int. Cl.
    *B60N 2/16*        (2006.01)
    *B60N 2/18*        (2006.01)
    *B60N 2/20*        (2006.01)

(56) References Cited

U.S. PATENT DOCUMENTS

| | | | | |
|---|---|---|---|---|
| 9,827,879 | B2 * | 11/2017 | Fujita | B60N 2/02253 |
| 9,963,050 | B2 * | 5/2018 | Pichardo Ramirez | |
| | | | | B60N 2/1655 |
| 10,442,320 | B2 * | 10/2019 | Kish | B60N 2/10 |
| 10,442,322 | B2 * | 10/2019 | Handigol | B60N 2/1695 |
| 10,744,909 | B2 * | 8/2020 | Kong | B60N 2/1615 |
| 10,933,775 | B2 * | 3/2021 | Castelli | B60N 2/1695 |
| 11,052,787 | B2 * | 7/2021 | Lett | B60N 2/1695 |
| 12,012,019 | B2 * | 6/2024 | Mochizuki | B60N 2/14 |
| 12,103,440 | B2 * | 10/2024 | Kim | B60N 2/3065 |
| 12,208,711 | B2 * | 1/2025 | Kim | B60N 2/1615 |
| 12,257,933 | B2 * | 3/2025 | Mochizuki | B60N 2/0732 |
| 12,275,338 | B2 * | 4/2025 | Kapusky | B60N 2/1615 |
| 12,280,697 | B2 * | 4/2025 | Tang | B60N 2/995 |
| 12,291,132 | B2 * | 5/2025 | Jung | B60N 2/02246 |
| 12,337,729 | B2 * | 6/2025 | Lee | B60N 2/165 |
| 12,503,016 | B2 * | 12/2025 | Napau | B60N 2/1615 |
| 2008/0309136 | A1 * | 12/2008 | Kojima | B60N 2/12 |
| | | | | 297/340 |
| 2022/0305965 | A1 * | 9/2022 | Lücke | B60N 2/02246 |
| 2023/0068286 | A1 * | 3/2023 | Kuntz | B60N 2/166 |
| 2023/0141294 | A1 * | 5/2023 | Zuo | B60N 2/1821 |
| | | | | 296/65.05 |
| 2024/0149752 | A1 * | 5/2024 | Kim | B60N 2/10 |
| 2025/0074265 | A1 * | 3/2025 | Epaud | B60N 2/20 |
| 2025/0115171 | A1 * | 4/2025 | Lee | B60N 2/20 |
| 2025/0206200 | A1 * | 6/2025 | Jung | B60N 2/02258 |
| 2025/0206201 | A1 * | 6/2025 | Jung | B60N 2/10 |
| 2025/0376086 | A1 * | 12/2025 | Suzuki | B60N 2/1615 |
| 2025/0376088 | A1 * | 12/2025 | Taniguchi | B60N 2/1842 |

* cited by examiner

SEAT FOR VEHICLE

CROSS REFERENCE TO RELATED APPLICATIONS

This application claims benefit of priority to Korean Patent Application No. 10-2023-0185560 filed on Dec. 19, 2023 in the Korean Intellectual Property Office, the disclosure of which is incorporated herein by reference in its entirety.

TECHNICAL FIELD

The present disclosure relates to a seat for a vehicle configured to improve safety and convenience of occupants while implementing various functions.

BACKGROUND

Generally, various seat adjustment devices, convenience devices, and safety devices are being installed on the interiors and exteriors of a seat for a vehicle, in addition to basic components, such as a seat cushion for supporting the lower body, a seat back for supporting the upper body, a headrest for supporting a head and a neck, and the like.

As an example of the safety devices, a bolster may be provided on left and right sides of the seat cushion and the seat back for supporting a side surface of an occupant, when the vehicle turns or makes a sharp turn. Typically, the bolster may be formed so that both side portions of the seat cushion or the seat back partially protrude.

Meanwhile, in vehicles having six or more seats, such as a sports utility vehicle (SUV), a minivan, or the like, there may be need to expand vehicle cargo space in a second row of the seats by folding the seat back and also to maximize a space to enter and exit the vehicle for occupants in a third row of seats.

However, in increasing a degree of protrusion of a bolster for the seat back in the second row of the seats, when the seat back is folded, the seat back may not become flat and may be tilted at an angle exceeding seven degrees with respect to a horizontal plane, for example. Moreover, when the degree of protrusion of the bolster for the seat back increases, a sliding walk-in function in which the second row of the seats moves in a forward direction may not be performed smoothly, making it difficult to secure the space to enter and exit a vehicle for occupants in the third row of the seats.

SUMMARY

An aspect of the present disclosure is to provide a seat for a vehicle capable of improving safety and convenience of occupants while integratedly implementing, for example, a relaxation function, a flattening function, a walk-in function, and the like.

According to an aspect of the present disclosure, a seat for a vehicle includes a pair of seat rails coupled to the vehicle and spaced apart from each other in left and right directions, a slider installed on the pair of seat rails to slide in forward and rearward directions, the slider being provided in pairs on left and right sides of the seat, a side frame configured to change a position thereof with respect to each of the pair of sliders, the side frame being provided in pairs on left and right sides of the seat, a link arm connecting the slider and the side frame on one side in forward and rearward directions, a linker connecting the slider and the side frame on the other side in forward and rearward directions, and including a plurality of link members, and a plurality of drivers respectively connected to the plurality of link members of the linker to provide rotational force.

The slider may include a moving rail respectively sliding along the seat rail, and a bracket mounted on the moving rail, wherein a hinge hole or a hinge portion connecting the link arm and the linker may be formed in the bracket.

The link arm may be located on a front side of the seat, and the linker may be located on a rear side of the seat, one end of the link arm may be rotatably hinged to the side frame, and the other end of the link arm may be rotatably hinged to the slider.

A spring assisting return of the link arm after rotation of the link arm, may be mounted on at least one hinge portion, among hinge portions on both ends of the link arm.

The linker may include a first link member and a second link member, wherein one end of the first link member may be rotatably hinged to the slider, the other end of the first link member may be hinged to one end of the second link member to rotate relative to each other, and the other end of the second link member may be rotatably hinged to the side frame.

The pair of side frames may be connected to each other by at least one cross-bar.

The plurality of drivers may include a first driver and a second driver, wherein the first driver may be connected to the first link member, and the second driver may be connected to the second link member.

The first driver may be mounted on one of the pair of sliders, and the second driver may be mounted on one of the pair of side frames.

The first driver may include a first driving motor, a first gearbox connected to a motor shaft of the first driving motor, a connection shaft connected to the first gearbox, and a pair of cores respectively coupled to both end portions of the connection shaft, wherein the connection shaft may be fixedly connected to the one end of the first link member via each of the pair of cores.

The seat may be executed at least in a relaxation mode and a tilt-up walk-in mode by the first driving motor.

In the relaxation mode, the first link member may rotate about the connection shaft in the slider in a first direction by rotational force applied by the first driving motor, and may simultaneously move the side frame in a rearward direction while lowering a rear portion of the side frame, and as the side frame moves, the link arm may rotate around a hinge point of the slider in the first direction.

In the tilt-up walk-in mode, the first link member may rotate about the connection shaft in the slider in a second direction by rotational force applied by the first driving motor, and may simultaneously move the side frame in a forward direction while raising a rear portion of the side frame, and as the side frame moves, the link arm may rotate around a hinge point of the slider in the second direction, and may simultaneously lower a front portion of the side frame.

The second driver may include a second driving motor, a second gearbox connected to a motor shaft of the second driving motor, and an output shaft of the second gearbox, wherein the output shaft may be connected to the other end of the second link member via the cross-bar.

The seat may be executed in a fold and dive mode by the second driving motor.

In the fold and dive mode, the second link member may rotate about the cross-bar and the output shaft in the side frame in a first direction by rotational force applied by the second driving motor, and may simultaneously move the side frame in a rearward direction, and as the side frame moves, the link arm may rotate around a hinge point of the slider in the first direction, and may simultaneously lower a front portion of the side frame.

In the fold and dive modes, the first link member may rotate about the connection shaft in the slider in the first direction by rotational force applied by the first driving motor, and may simultaneously move the side frame in a rearward direction while lowering a rear portion of the side frame, and as the side frame moves, the link arm may rotate around the hinge point of the slider in the first direction, and may simultaneously lower the front portion of the side frame.

According to an aspect of the present disclosure, a seat for a vehicle includes a pair of seat rails coupled to the vehicle and spaced apart from each other in left and right directions, a slider installed on the pair of seat rails to slide in forward and rearward directions, the slider being provided in pairs on left and right sides of the seat, a side frame configured to change a position thereof with respect to each of the pair of sliders, the side frame being provided in pairs on left and right sides of the seat, a link arm connecting the slider and the side frame on one side in forward and rearward directions, a linker connecting the slider and the side frame on the other side in forward and rearward directions, and including a first link member and a second link member, and a plurality of drivers respectively connected to the first link member and the second link member to provide rotational force, wherein the slider, the link arm, the side frame, the second link member, and the first link member are hinged to each other to form a five-bar linkage mechanism.

The link arm may be located on a front side of the seat, and the linker may be located on a rear side of the seat.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
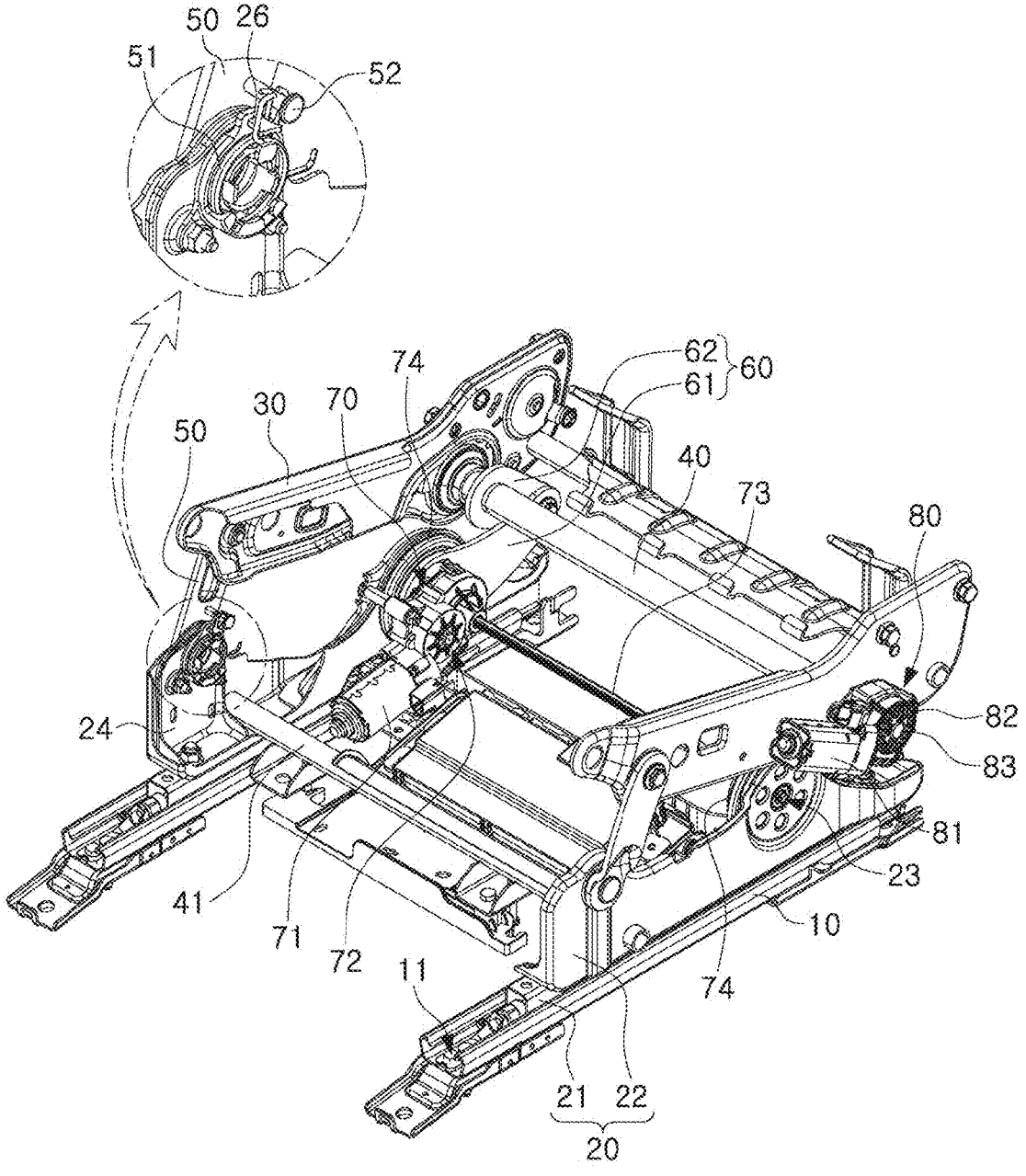
FIG. 1 is a partial perspective view illustrating a seat for a vehicle according to an embodiment of the present disclosure.

Hereinafter, the present disclosure is illustrated in detail with reference to the drawings. In adding reference numerals to components of each of the drawings, it should be noted that the same components have the same numerals as much as possible even if they are displayed on different drawings.

In the present specification, terms such as first, second, and the like may be used to describe various components, but an order, sizes, magnitudes, positions, and importance of these components are not limited by terms such as first, second, and the like, and may be named only for the purpose of distinguishing one component from another component.

Figure 2:
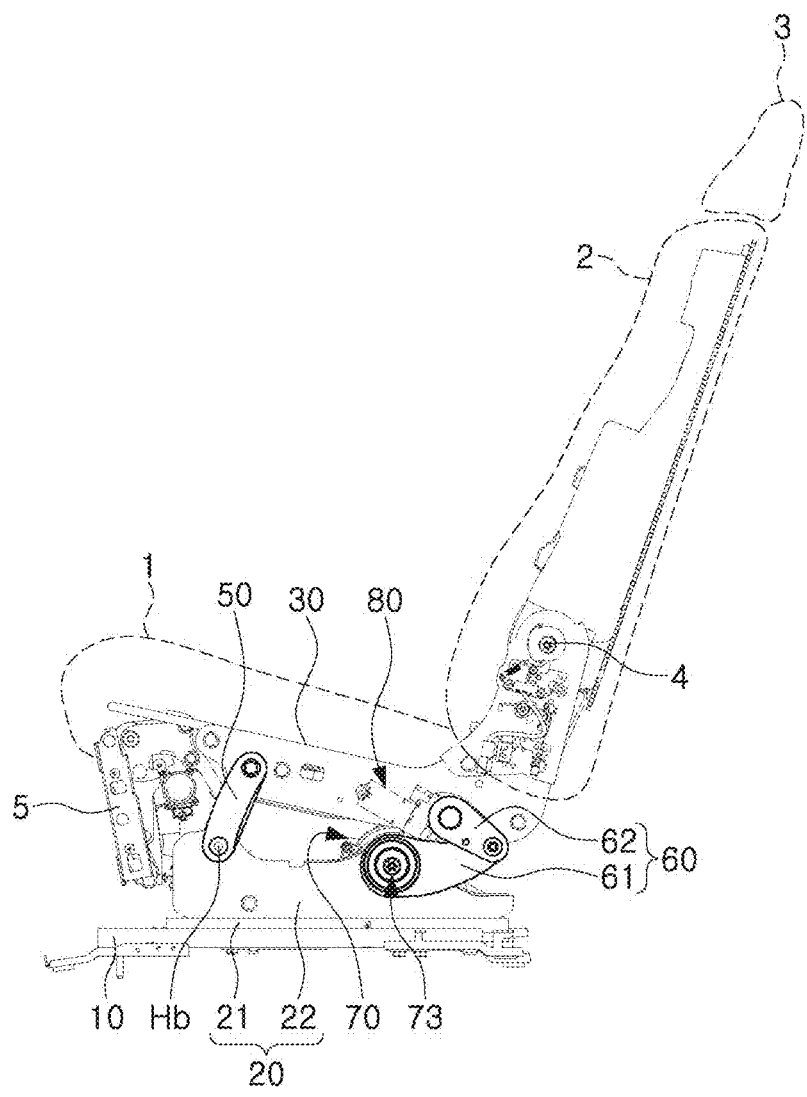
FIG. 2 is a side view of FIG. 1 illustrating a reference posture for operation.

FIG. 1 is a partial perspective view illustrating a seat for a vehicle according to an embodiment of the present disclosure, and FIG. 2 is a side view of FIG. 1 illustrating a reference posture for operation. Additionally, FIG. 3 is an exploded perspective view of FIG. 1.

A seat for a vehicle according to an embodiment of the present disclosure may include a seat cushion 1 for seating a lower body, a seat back 2 for leaning an upper body, and a headrest 3 for supporting a head and a neck. However, for convenience of illustration and explanation, detailed drawings and detailed description will be omitted.

Figure 3:
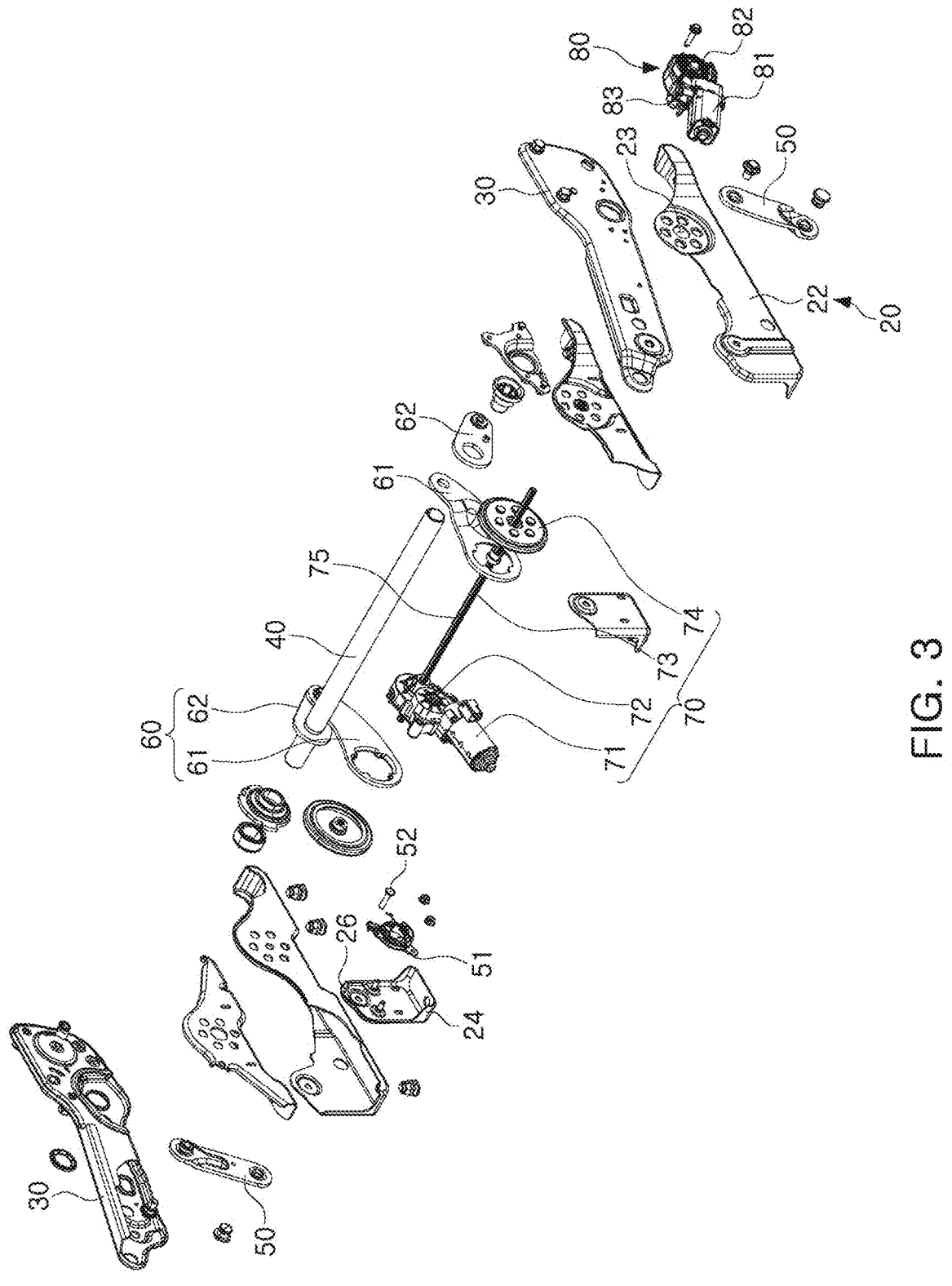
FIG. 3 is an exploded perspective view of the main portion of FIG. 1.

As illustrated in FIGS. 1 to 3, a seat for a vehicle according to an embodiment of the present disclosure may include a pair of seat rails 10, a pair of sliders 20, a pair of side frames 30, a link arm 50, a linker 60, and a plurality of drivers 70 and 80.

The pair of seat rails 10 may be arranged on left and right sides of the seat and spaced apart from each other on a floor panel in the interior of the vehicle. Specifically, an open passage 11 elongated in forward and rearward directions for sliding of a slider 20 may be formed on a seat rail. The open passage may form a path for the sliding of the slider.

The pair of sliders 20 may be installed on each of the seat rails 10 to slide forward and rearward in a longitudinal direction of the seat rail to support the bottom portion of the seat. Each of the sliders may include a moving rail 21 sliding along the open passage 11 of the seat rail, and a bracket 22 mounted on the moving rail.

The moving rail 21 may be configured as a manual type achieved by manipulating a towel bar, and an electric type achieved by receiving power from a motor according to an operation of a switch. Since a configuration and an operational relationship of the moving rail have been already known, detailed description thereof will be omitted in the present specification.

In the bracket 22, a hinge hole 23 or a hinge portion for connecting the link arm 50 and the linker 60 may be formed, and an auxiliary bracket 24 and the like may be additionally provided.

The pair of side frames 30 may be respectively disposed on a slider 20 corresponding thereto, to be arranged side by side with each other, and may support a cushion panel (not illustrated) configured to support load of an occupant below the cushion panel. The pair of side frames may be connected to each other by at least one cross-bar 40.

The cross-bar 40 may be a member connecting and supporting the pair of side frames 30 on left and right sides of the seat in left and right directions, and may be disposed on at least one of the front and rear sides of the seat. The cross-bar may be formed as a tubular member having a circular cross-section, but a configuration thereof is not necessarily limited thereto.

Optionally, at least one auxiliary cross-bar 41 may be interposed to connect and support the pair of sliders 20 on left and right sides of the seat in the left and right directions. For example, FIG. 1 illustrates an example in which the auxiliary cross-bar is disposed in front of the slider, but the number and arrangement of auxiliary cross-bars are not necessarily limited thereto.

The link arm 50 and the linker 60 may be arranged on both left and right sides of the seat, respectively. For example, the link arm and the linker may each be provided in pairs. A link arm and a linker may be arranged between a slider 20 and a side frame 30 on one side of the left and right sides of the seat, and a link arm and a linker may be arranged between a slider and a side frame on the other side of the left and right sides of the seat.

The link arm 50 may connect the slider 20 and the side frame 30 on one side of the seat in the forward and rearward directions, for example, in front of the seat. One end of the link arm may be rotatably hinged to the side frame 30, and the other end of the link arm may be rotatably hinged to the bracket 22 of the slider 20.

Optionally, a spring 51 assisting return of the link arm after rotation of the link arm, may be mounted on at least one of the hinge portions on both ends of the link arm 50. For example, one end of the spring may be fixed to a protrusion 26 formed on the bracket 22 of the slider 20, and the other end of the spring may be fixed to a fixing pin 52 provided on the link arm. A torsion spring may be used as the spring 51, but is not necessarily limited thereto.

For example, when the seat returns to a reference posture of the seat illustrated in FIG. 2 after a fold and dive mode to be described later is executed, The link arm 50 may rotate smoothly by restoring force of the spring 51 together with driving force of the drivers 70 and 80, to stably secure return performance of the seat.

The linker 60 may connect the slider 20 and the side frame 30 on one side of the forward and rearward directions of the seat, for example, at the rear of the seat. To this end, the linker may include a first link member 61 and a second link member 62.

One end of the first link member 61 may be rotatably hinged to the bracket 22 of the slider 20, and the other end of the first link member may be rotatable hinged to one end of the second link member 62. Additionally, the other end of the second link member may be rotatably hinged to the side frame 30.

As described above, the drawings illustrate an example in which the link arm 50 is located on the front side of the seat, while the linker 60 is located on the rear side of the seat. However, coupling or arrangement of the link arm and the linker is not necessarily limited thereto, and, for example, vice versa.

In a seat for a vehicle according to an embodiment of the present disclosure, among the components, the slider 20, the link arm 50, the side frame 30, and the second link member 62 and the first link member 61 of the linker 60 may form a five-bar linkage mechanism by being hinged to each other.

The plurality of drivers 70 and 80 providing rotational force may be installed on the linker 60 by being respectively connected to the first link member 61 and the second link member 62 to adjust an inclination angle and/or a height of the side frame 30 with respect to the seat rail 10 or the slider 20. The plurality of drivers may include a first driver 70 and a second driver 80.

The first driver 70 may be connected to the first link member 61. As illustrated in FIGS. 1 and 3, the first driver may be mounted on an internal side surface of the bracket 22 of one of the pair of sliders 20 disposed on both left and right sides of the seat, for example, by bolting.

The first driver 70 may include a first driving motor 71, a first gearbox 72 connected to a motor shaft of the first driving motor, a connection shaft 73 connected to an output side of the first gearbox, and a pair of cores 74 respectively coupled to both end portions of the connection shaft.

The first gearbox 72 may include, for example, a worm shaft installed on the motor shaft of the first driving motor 71, a worm wheel engaged with an outer peripheral surface of the worm shaft, and an output gear linked to the worm wheel, and the connection shaft 73 may be connected to the output gear. However, a configuration of the first gearbox is not necessarily limited thereto.

The connection shaft 73 may be fixedly connected to one end of the first link member 61 via a core 74, to act as a hinge shaft. In addition, an external spline 75 may be formed on an outer peripheral surface of the connection shaft to engage with an internal spline formed on the output gear in the first gear box. As a result, the connection shaft may transmit rotational force of the first driving motor 71 to the first link member.

The pair of cores 74 may be formed in a plate shape having approximately a predetermined thickness, and may be coupled to both end portions of the connection shaft 73, for example, in a fixed manner not to rotate relative to each other. The first link member 61 may be fixedly coupled to one side of the core, for example, a surface of the core facing a central portion of the seat, and a stepped portion formed on the other side of the core, for example, a surface of the core facing an outside of the seat, may be rotatably connected to the hinge hole 23 formed in the bracket 22 of the slider 20.

Such a core 74 may be applied to be fixed to the hinge portion of the first link member 61 in the linker 60, to act as a restraint means for securing strength of the linker when the linker is fixed without rotating, and preventing the linker from moving in the forward and rearward directions.

As a result, rotational force of the first driving motor 71 may be transmitted to the first link member 61 through the first gearbox 72 and the connection shaft 73, to rotate the first link member relative to the slider 20. At the same time, due to rotation of the first link member, the second link member 62 connected to the side frame 30 may rotate relative to the first link member.

A seat for a vehicle according to an embodiment of the present disclosure may be executed in not only a relaxation mode and a tilt-up walk-in mode, but also a fold and dive mode (a folding & sinking mode) by such a first driver 70.

The second driver 80 may be connected to the second link member 62. As illustrated in FIGS. 1 and 3, the second driver may be mounted on an external side surface of one of the pair of side frames 30, for example, by bolting.

Although the second driver 80 may be mounted only on one side frame of the pair of side frames 30, the pair of side frames on left and right sides of the seat and the other end of the second link members 62 on both sides may be connected to each other by the cross-bar 40. Therefore, when an inclination angle and/or a height of one side frame are adjusted, an inclination angle and/or a height of the other side frame may also be synchronously adjusted in the same manner.

The second driver 80 may include a second driving motor 81, a second gearbox 82 connected to a motor shaft of the second driving motor, and an output shaft 83 of the second gearbox.

The second gearbox 82 may include, for example, a worm shaft installed on the motor shaft of the second driving motor 81, a worm wheel engaged with an outer peripheral surface of the worm shaft, and the output shaft 83 connected to the worm wheel. However, a configuration of the second gearbox is not necessarily limited thereto.

The output shaft 83 may pass through the side frame 30, and may be connected to the other end of the second link member 62 via the cross-bar 40, to act as a hinge shaft.

For example, as illustrated in FIG. 1, one cross-bar 40 may be located on the rear side of the seat between a pair of side frames 30 on both left and right sides. Both end portions of the cross-bar may pass through each of the side frames, and may be coupled to relatively rotate with respect to the side frame, and one end portion of the cross-bar may be fixedly coupled to the output shaft 83 of the second gearbox 82 through a spline or the like.

In this case, an end portion of the cross-bar 40 may be fixed to the other end of the second link member 62. For example, the end portion of the cross-bar may pass through the second link member, and the cross-bar and the second link member may be integrally coupled to each other by welding or the like.

Therefore, the cross-bar 40 fixed to the output shaft 83 of the second gear box 82 may rotate by receiving rotational force of the second driving motor 81, and the second link member 62 fixed to the cross-bar may rotate relative to the side frame 30 around the cross-bar and the output shaft.

At the same time, due to rotation of the second link member 62, the first link member 61 rotatably hinged to the slider 20 may rotate relative to the second link member. Additionally, as the second link member rotates, the cross-bar 40 may move in upward and downward directions while rotating.

Due to vertical movement of the cross-bar 40, both side frames 30 may move in upward and downward directions, which allows the seat cushion and the entire seat to move in upward and downward directions, to adjust a height or to adjust tilting of the seat cushion.

Such a second driver 80 allows a seat for a vehicle according to an embodiment of the present disclosure to perform a fold and dive mode.

A recliner 4 may be interposed between the seat cushion 1 and the seat back 2 of a seat for a vehicle according to an embodiment of the present disclosure, to appropriately adjust an inclination angle of the seat back with respect to the seat cushion by the recliner. The recliner may use a motor to employ the seat as a so-called power seat.

Since recliners having various configurations have been already known, detailed description thereof will be omitted in the present specification.

Additionally, in a seat for a vehicle according to an embodiment of the present disclosure, a leg rest 5 may be optionally disposed in front of the seat cushion 1. The leg rest may include a predetermined support surface capable of supporting a leg (calf) portion of the occupant.

The leg rest 5 may be configured to allow angle adjustment, regardless of the seat cushion 1 or the seat back 2. For example, the leg rest may be independently unfolded or folded using a separate power source, regardless of adjustment of the inclination angle and height of the seat cushion. An operation of the leg rest only needs to not interfere with or not interrupt an operation of the seat cushion.

Since leg rests having various configurations have been already known, detailed description thereof will be omitted in the present specification.

A seat for a vehicle according to an embodiment of the present disclosure may further include a switch (not illustrated) for inputting a request of the occupant, and a controller (not illustrated) for controlling operations of the driving motors 71 and 81 and/or other motors according to an operation of the switch.

The controller may control an operation of the first driving motor 71 constituting the first driver 70 and an operation of the second driving motor 81 constituting the second driver 80, based on the operation of the switch by the occupant. In this case, as the first and second driving motors, for example, a servo motor, a step motor, or the like, capable of rotating in forward and reverse directions, may be employed.

Hereinafter, an operation of a seat for a vehicle according to an embodiment of the present disclosure, having the above-described configuration, will be described.

First, a seat for a vehicle according to an embodiment of the present disclosure may basically implement a forward and rearward mode.

For example, when an electric type moving rail 21 is adopted, as illustrated in FIG. 2, in a seat for a vehicle according to an embodiment of the present disclosure, in a state maintaining a reference posture, a motor may drive in response to a request of the occupant, e.g., an operation of the switch, and driving force of the motor may be transmitted to the moving rail through a power transmission mechanism, to move the moving rail relative to the seat rail in a longitudinal direction of the seat rail 10.

In this case, the side frame 30 connected to the moving rail 21 may move together, allowing the seat cushion 1 and the entire seat to move in a forward or rearward direction to adjust front and rear positions of the seat.

Figure 4:
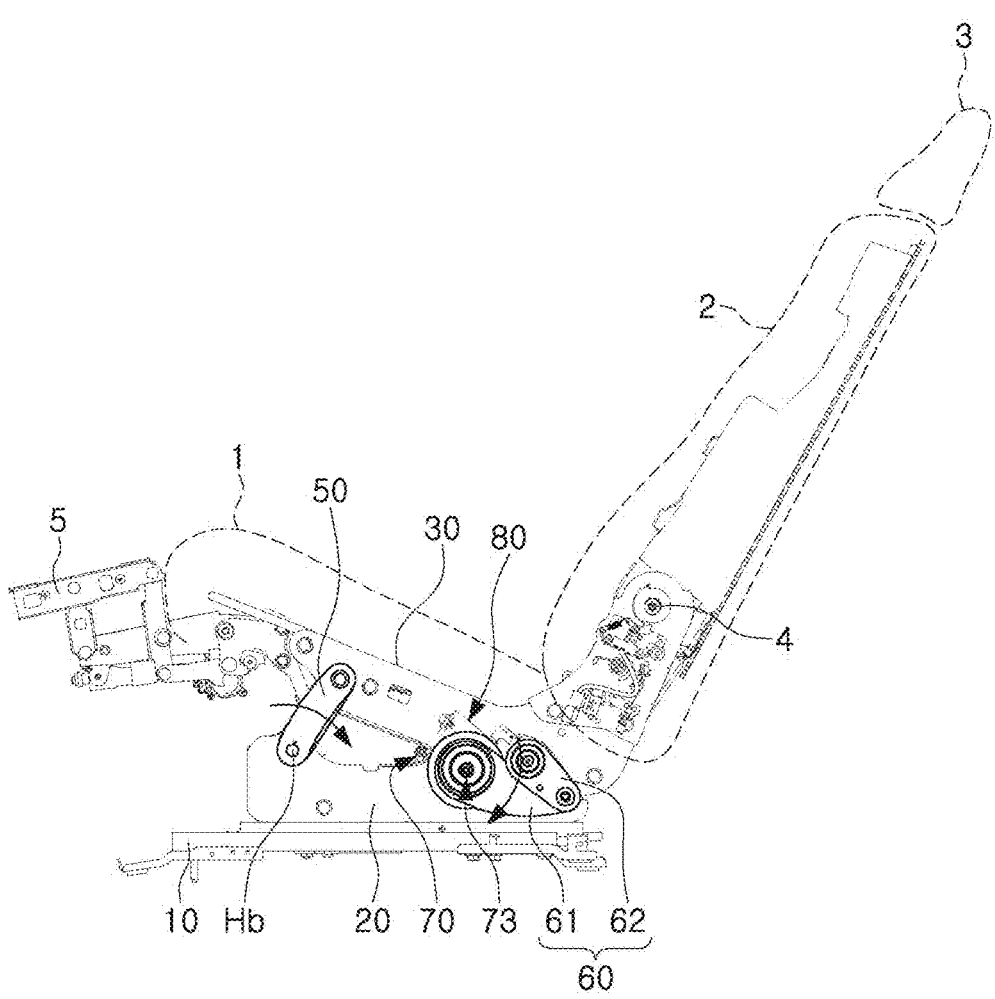
FIG. 4 is a view illustrating a relaxation mode of a seat for a vehicle according to an embodiment of the present disclosure.

FIG. 4 is a view illustrating a relaxation mode of a seat for a vehicle according to an embodiment of the present disclosure.

In a seat for a vehicle according to an embodiment of the present disclosure, a seat cushion 1 may be tilted such that a rear portion thereof is relatively low.

For example, when a link arm 50 is located on a front side of the seat and a linker 60 is located on a rear side of the seat, a controller may control an operation of a first driving motor 71 constituting a first driver 70 in response to a request of an occupant, e.g., an operation of a switch.

The first driving motor 71 connected to a first link member 61 of the linker 60 via a connection shaft 73 may be driven, and a motor shaft of the first driving motor may rotate in one direction.

As a result, rotational force of the first driving motor 71 may be transmitted to the first link member 61 through a first gearbox 72 and the connection shaft 73, such that the first link member rotates around the connection shaft in a bracket 22 of a slider 20 in a first direction (clockwise in FIG. 4), and, at the same time, a rear portion of a side frame 30 is lowered in a downward direction.

Due to rotation of the first link member 61, both side frames 30 may move in a rearward direction. As the side frame moves, the link arm 50 may rotate around a hinge point Hb of the bracket 22 in the first direction, and, at the same time, a front portion of the side frame may be slightly lowered in a downward direction. Preferably, the first link member may rotate such that a rear end portion of the seat cushion 1 reaches the lowest position.

In this case, a second driver 80 may not operate. For example, a second driving motor 81 may not be driven in a relaxation mode.

Optionally, when a leg rest 5 is disposed in front of the seat cushion 1, the controller may control a separate power source to independently unfold the leg rest.

In this manner, in a seat for a vehicle according to an embodiment of the present disclosure, an inclination angle of the side frame 30 may be changed in the relaxation mode by a five-bar linkage mechanism, and the rear portion of the side frame may be further lowered, such that a lower body of the occupant may be supported by the tilted seat cushion 1.

Therefore, in a seat for a vehicle according to an embodiment of the present disclosure, the rear portion of the seat cushion 1 may be located relatively much lower than a front portion thereof, such that the occupant may have an easy and comfortable posture.

A seat for a vehicle according to an embodiment of the present disclosure may have an effect of improving convenience of the occupant by such tilting of the seat cushion 1.

Figure 5:
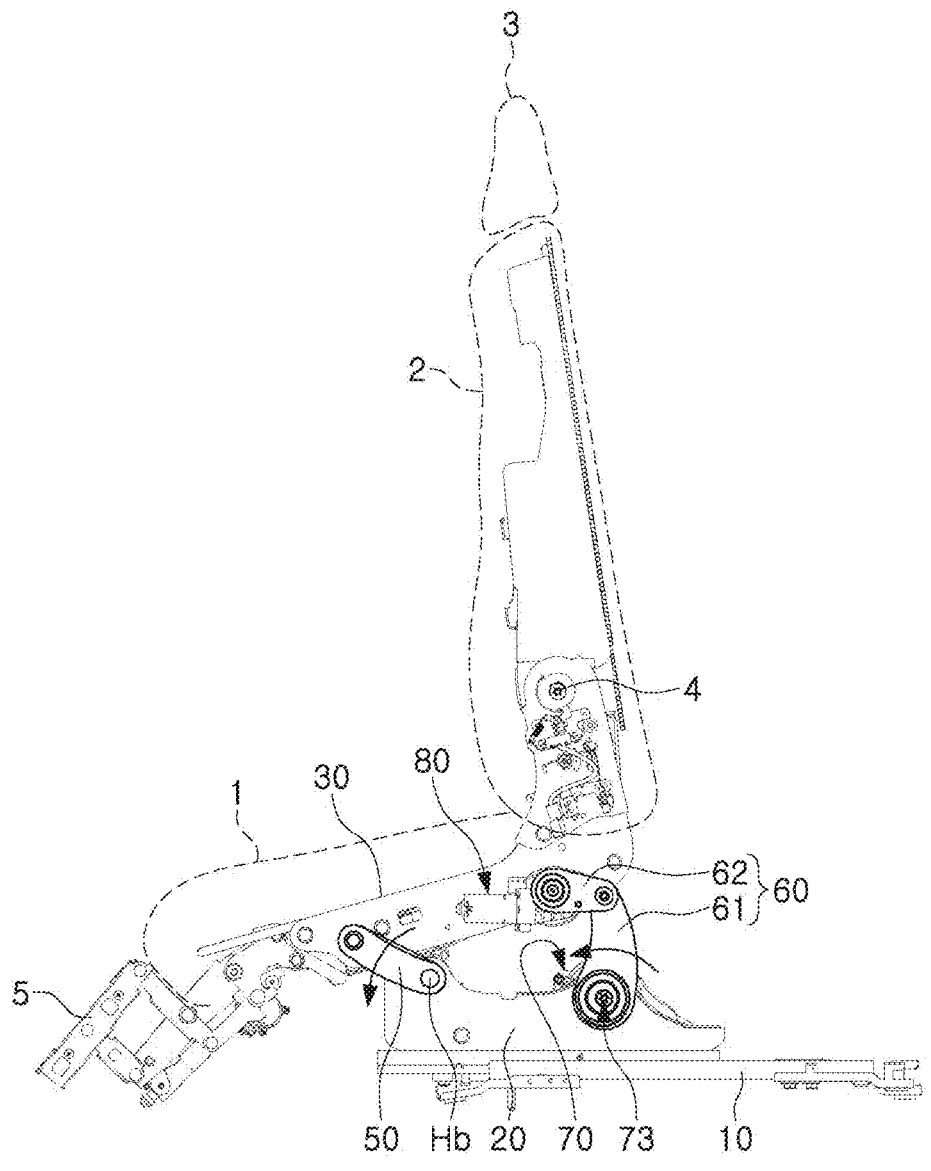
FIG. 5 is a view illustrating a tilt-up walk-in mode of a seat for a vehicle according to an embodiment of the present disclosure.

FIG. 5 is a view illustrating a tilt-up walk-in mode of a seat for a vehicle according to an embodiment of the present disclosure.

In a seat for a vehicle according to an embodiment of the present disclosure, a seat cushion 1 may move in a forward direction, and, at the same time, may be tilted, such that a front portion thereof is relatively lower.

For example, when a link arm 50 is located on a front side of the seat and a linker 60 is located on a rear side of the seat, a controller may control an operation of a first driving motor 71 constituting a first driver 70 in response to a request of an occupant, e.g., an operation of a switch.

The first driving motor 71 connected to a first link member 61 of the linker 60 via a connection shaft 73 may be driven, and a motor shaft of the first driving motor may rotate in an opposite direction.

As a result, rotational force of the first driving motor 71 may be transmitted to the first link member 61 through a first gearbox 72 and the connection shaft 73, such that the first link member rotates around the connection shaft in a bracket 22 of a slider 20 in a second direction (counterclockwise in FIG. 5), and, at the same time, a rear portion of a side frame 30 is raised in an upward direction.

Due to rotation of the first link member 61, both side frames 30 may move in a forward direction. As the side frame moves, the link arm 50 may rotate around a hinge point Hb of the bracket 22 in the second direction, and, at the same time, a front portion of the side frame may be lowered in a downward direction.

In this case, a second driver 80 may not operate. For example, a second driving motor 81 may not be driven in a tilt-up walk-in mode.

In this manner, in a seat for a vehicle according to an embodiment of the present disclosure, an inclination angle of the side frame 30 may be changed through the tilt-up walk-in mode by a five-bar linkage mechanism, and the rear portion of the side frame may be raised more than a front portion thereof, to tilt the seat back 2 further forward than a vertical plane, and move the seat cushion 1 and the entire seat in a forward direction.

Therefore, when a seat for a vehicle according to an embodiment of the present disclosure is applied to a second row of seats in a vehicle having 6 or more seats, there may be advantages that a walk-in function in which the second row of the seats moves in a forward direction may be smoothly achieved even when a degree of protrusion of a bolster for the seat back increases.

A seat for a vehicle according to an embodiment of the present disclosure may have effects of improving safety and convenience of occupants in entering and exiting a vehicle, by securing a space to enter and exit vehicle for occupants in a third row of the seats through a tilt-up walk-in mode of the seat.

Figure 6:
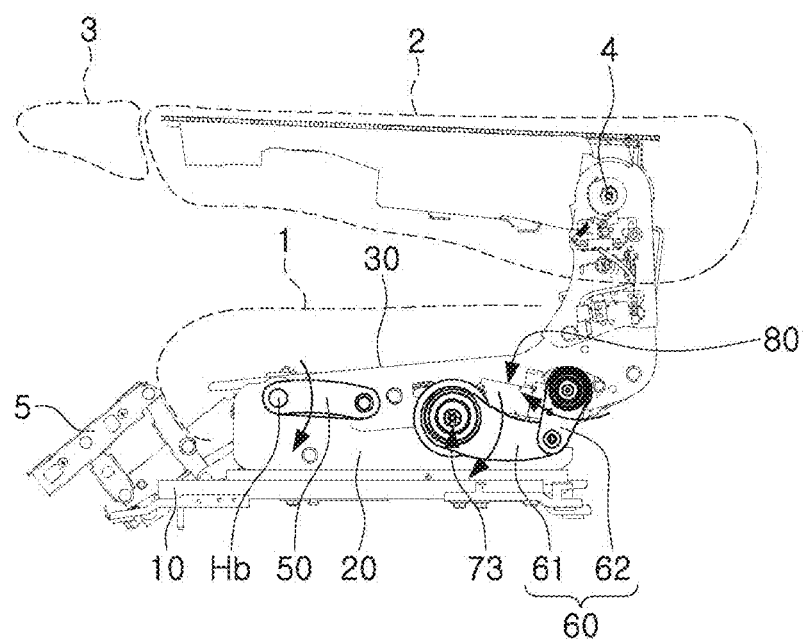
FIG. 6 is a view illustrating a fold and dive mode of a seat for a vehicle according to an embodiment of the present disclosure.

FIG. 6 is a view illustrating a fold and dive mode of a seat for a vehicle according to an embodiment of the present disclosure.

In a seat for a vehicle according to an embodiment of the present disclosure, when a seat back 2 is folded, the seat back may be flattened and a seat cushion 1 may be lowered.

For example, when a link arm 50 is located on a front side of the seat, a linker 60 is located on a rear side of the seat, and a recliner 4 is interposed between the seat cushion 1 and the seat back 2, a controller may control an operation of a second driving motor 81 constituting a second driver 80 and an operation of a first driving motor 71 constituting a first driver 70, together with a motor of the recliner, in response to a request of an occupant, e.g., an operation of a switch.

From a reference posture of the seat illustrated in FIG. 2, after the seat back 2 is folded according to an operation of the recliner 4, the second driving motor 81 connected to a second link member 62 of the linker 60 may drive, and a motor shaft of the second driving motor may rotate in one direction.

As a result, rotational force of the second driving motor 81 may be transmitted to the second link member 62 through a second gearbox 82, an output shaft 83, and a cross-bar 40, such that the second link member rotates around the cross-bar and the output shaft in a side frame 30 in a first direction (clockwise in FIG. 6), and, at the same time, a rear portion of the side frame may be slightly raised in an upward direction.

Due to rotation of a second link member 62, both side frames 30 may move in a rearward direction. As the side frame moves, the link arm 50 may rotate around a hinge point Hb of a bracket 22 of a slider 20 in the first direction, and, at the same time, a front portion of the side frame may be lowered in a downward direction.

Next, the first driver 70 may operate. For example, even in a fold and dive mode, the first driving motor 71 may drive, and a motor shaft of the first driving motor may rotate in one direction.

As a result, rotational force of the first driving motor 71 may be transmitted to the first link member 61 through a first gearbox 72 and a connection shaft 73, such that the first link member rotates around the connection shaft in a bracket 22 of a slider 20 in a first direction (clockwise in FIG. 6), and, at the same time, a rear portion of a side frame 30 is lowered in a downward direction.

Due to rotation of the first link member 61 after rotation of the second link member 62, both side frames 30 may be further moved in a rearward direction. As the side frame moves, the link arm 50 may further rotate around the hinge point Hb of the bracket 22 in the first direction, and, at the same time, the front portion of the side frame may be further lowered in a downward direction.

Finally, in a fold and dive mode, a height of the seat cushion 1 and the entire seat may be lower than a reference posture of the seat illustrated in FIG. 2, and the front portion of the side frame 30 may be relatively lower than the rear portion.

Optionally, when a leg rest 5 is disposed in front of the seat cushion 1, the controller may control a separate power source to independently unfold the leg rest.

In this manner, in a seat for a vehicle according to an embodiment of the present disclosure, an inclination angle of the side frame 30 may be changed in the fold and dive mode by a five-bar linkage mechanism, and the front and rear portions of the side frame may be simultaneously lowered, such that the seat back 2 is substantially parallel to a horizontal plane and the height of the seat cushion 1 and the entire seat is lowered.

Therefore, when a seat for a vehicle according to an embodiment of the present disclosure is applied to a second row of seats in a vehicle having 6 or more seats, there may be advantages that the seat back becomes almost flat and a step difference with a third row of seats is eliminated when the seat back 2 is folded in the fold and dive mode, even when a degree of protrusion of a bolster for the seat back increases.

In the fold and dive mode of a seat for a vehicle according to an embodiment of the present disclosure, the seat back 2 may be tilted at an angle of, for example, 3 degrees with respect to the horizontal plane, to be folded almost parallel to the horizontal plane.

A seat for a vehicle according to an embodiment of the present disclosure has an effect of improving loading performance of the vehicle and diversifying uses of a cargo loading space by expanding the cargo loading space of the vehicle by flattening of the seat back.

As described above, according to an embodiment of the present disclosure, due to a configuration of applying a five-bar linkage mechanism in which a plurality of drivers are disposed in the linker, for example, a relaxation function, a flattening function, a walk-in function, and the like may be integratedly implemented, and safety and convenience of occupants may be improved.

While example embodiments have been illustrated and described above, it will be apparent to those skilled in the art that modifications and variations could be made without departing from the scope of the present disclosure as defined by the appended claims.

Therefore, embodiments disclosed in the present specification and drawings are not intended to limit the technical spirit of the present disclosure, but to explain, and the scope of the technical spirit of the present disclosure is not limited by the embodiments. The protection scope of the present disclosure should be construed according to the following claims, and all technical ideas within the equivalent range should be construed as being included in the scope of the present disclosure.

The invention claimed is:

1. A seat for a vehicle, comprising:
a first seat rail and a second seat rail coupled to the vehicle and spaced apart from each other in left and right directions;
a first slider positioned on the first seat rail on a left side of the seat and a second slider positioned on the second seat rail on a right side of the seat, wherein the first and second sliders are configured to slide in forward and rearward directions;
a first side frame positioned on the left side of the seat and configured to change position with respect to the first slider, and a second side frame positioned on the right side of the seat and configured to change position with respect to the second slider;
a link arm connecting the first slider and the first side frame on one side in forward and rearward directions;
a linker connecting the first slider and the first side frame on another side in forward and rearward directions, and including a plurality of link members; and
a plurality of drivers connected to the plurality of link members of the linker to provide rotational force;
wherein the linker comprises a first link member and a second link member;
wherein the plurality of drivers comprises a first driver and a second driver; and
wherein the first driver is connected to the first link member, and the second driver is connected to the second link member.

2. The seat of claim 1, wherein each of the first and second sliders comprise:
a moving rail sliding along the seat rail; and
a bracket mounted on the moving rail;
wherein the bracket includes a hinge hole or a hinge portion connecting the link arm and the linker.

3. The seat of claim 1, wherein:
the link arm is positioned on a front side of the seat, and the linker is positioned on a rear side of the seat; and one end of the link arm is rotatably hinged to the first side frame, and another end of the link arm is rotatably hinged to the first slider.

4. The seat of claim 3, wherein after rotation of the link arm, a spring assisting return of the link arm is mounted on at least one hinge portion, among hinge portions on both ends of the link arm.

5. The seat of claim 1,
wherein one end of the first link member is rotatably hinged to the first slider;
another end of the first link member is hinged to one end of the second link member to rotate relative to each other; and
another end of the second link member is rotatably hinged to the first side frame.

6. The seat of claim 5, wherein the first and second side frames are connected by at least one cross-bar.

7. The seat of claim 1, wherein the first driver is mounted on one of the first slider or the second slider, and the second driver is mounted on one of the first side frame or the second side frame.

8. The seat of claim 1, wherein the first driver comprises:
a first driving motor;
a first gearbox connected to a motor shaft of the first driving motor;
a connection shaft connected to the first gearbox; and
a first core coupled to one end portion of the connection shaft and a second core coupled to another end portion of the connection shaft;
wherein the connection shaft is fixedly connected to the one end of the first link member via each of the first and second cores.

9. The seat of claim 8, wherein the first driving motor is configured to control the seat in at least a relaxation mode and a tilt-up walk-in mode.

10. The seat of claim 9, wherein, in the relaxation mode,
the first link member is configured to rotate about the connection shaft in the first slider in a first direction by a rotational force applied by the first driving motor, and to simultaneously move the first side frame in a rearward direction while lowering a rear portion of the first side frame, and
as the first side frame moves, the link arm is configured to rotate around a hinge point of the first slider in the first direction.

11. The seat of claim 9, wherein, in the tilt-up walk-in mode,
the first link member is configured to rotate about the connection shaft in the first slider in a second direction by a rotational force applied by the first driving motor, and to simultaneously move the first side frame in a forward direction while raising a rear portion of the first side frame, and
as the first side frame moves, the link arm is configured to rotate around a hinge point of the first slider in the second direction, and to simultaneously lower a front portion of the first side frame.

12. The seat of claim 8, wherein the second driver comprises:
a second driving motor;
a second gearbox connected to a motor shaft of the second driving motor; and
an output shaft of the second gearbox;
wherein the output shaft is connected to another end of the second link member via the at least one cross-bar.

13. The seat of claim 12, wherein the second driving motor is configured to control the seat in a fold and dive mode.

14. The seat of claim 13, wherein, in the fold and dive mode, the second link member is configured to rotate about the at least one cross-bar and the output shaft in the first side frame in a first direction by a rotational force applied by the second driving motor, and to simultaneously move the first side frame in a rearward direction, and as the side frame moves, the link arm is configured to rotate around a hinge point of the first slider in the first direction, and to simultaneously lower a front portion of the first side frame.

15. The seat of claim 14, wherein, in the fold and dive mode, the first link member is configured to rotate about the connection shaft in the slider in the first direction by a rotational force applied by the first driving motor, and to simultaneously move the first side frame in a rearward direction while lowering a rear portion of the first side frame, and as the side frame moves, the link arm is configured to rotate around the hinge point of the first slider in the first direction, and to simultaneously lower the front portion of the first side frame.

16. A seat for a vehicle, comprising:

a first seat rail and a second seat rail coupled to the vehicle and spaced apart from each other in left and right directions;

a first slider positioned on the first seat rail on a left side of the seat, and a second slider positioned on the second seat rail on a right side of the seat, wherein the first and second sliders are configured to slide in forward and rearward directions;

a first side frame positioned on the left side of the seat and configured to change position with respect to the first slider, and a second side frame positioned on the right side of the seat, and configured to change position with respect to the second slider;

a link arm connecting the first slider and the first side frame on one side in forward and rearward directions;

a linker connecting the first slider and the first side frame on another side in forward and rearward directions, and the linker including a first link member and a second link member; and a plurality of drivers connected to the first link member and the second link member and configured to provide a rotational force;

wherein the first slider, the link arm, the first side frame, the second link member, and the first link member are hinged to each other to form a five-bar linkage mechanism;

wherein the plurality of drivers comprises a first driver and a second driver; and wherein the first driver is connected to the first link member, and the second driver is connected to the second link member.

17. The seat of claim 16, wherein the link arm is located on a front side of the seat, and the linker is located on a rear side of the seat.

* * * * *